Dec. 28, 1937. W. G. VOLLMER 2,103,568
MOTOR BLOCK STAND
Filed Aug. 21, 1936

INVENTOR
Walter G. Vollmer.
By
ATTORNEY

Patented Dec. 28, 1937

2,103,568

UNITED STATES PATENT OFFICE 2,103,568

MOTOR-BLOCK STAND

Walter G. Vollmer, St. Louis, Mo., assignor to H & H Machine & Motor Parts Co., St. Louis, Mo., a corporation of Missouri Application August 21, 1936, Serial No. 97,199

3 Claims. (Cl. 77—63)

This invention relates generally to machine shop fixtures. More particularly, my invention relates to a certain new and useful improvement in stands for supporting automotive engine blocks in position for cylinder boring and has for its primary object the provision of a sturdy, durable, inexpensive cradle-like stand for supporting the block shiftably or swingably for enabling conveniently different cylinder boring or other repair or production operations.

And with these and other objects in view, my invention resides in the novel features of form, construction, arrangement, and combination of parts presently described and pointed out in the claims.

In the accompanying drawing,—

Figure 1:
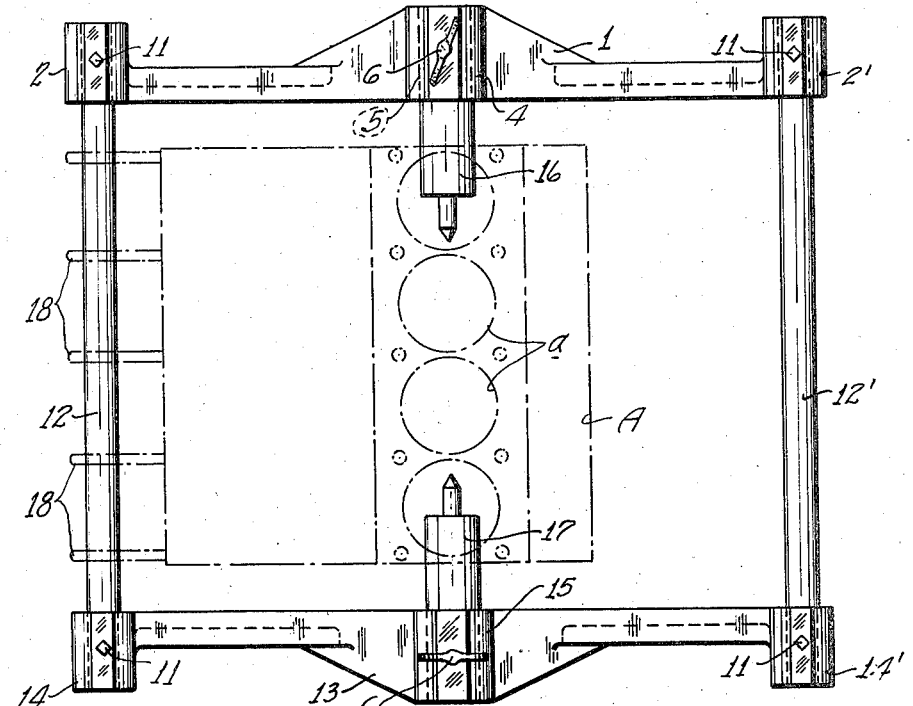
Figure 2:
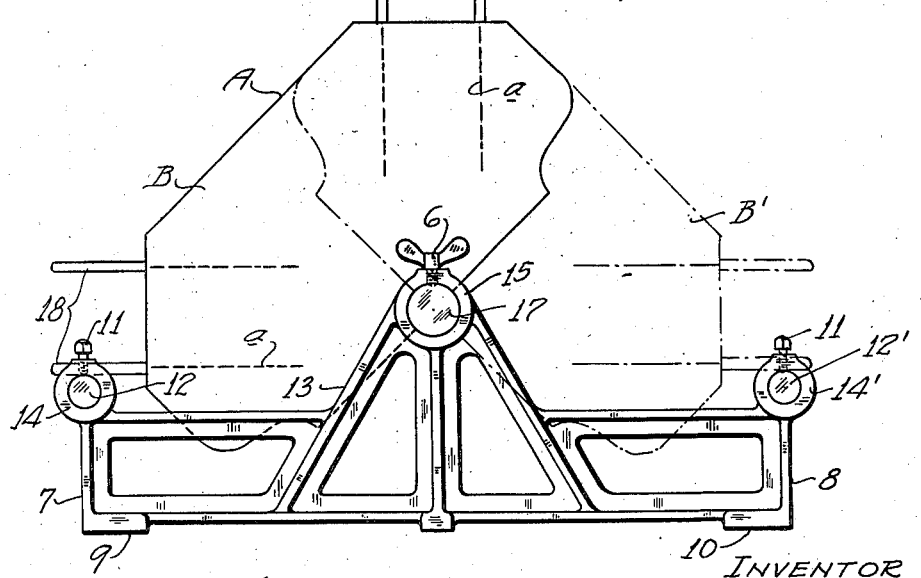

Figure 1 is a horizontal plan view of a machine shop fixture or stand constructed according to and embodying my present invention; and Figure 2 is an end elevational view of the fixture or stand.

Referring now more in detail and by reference characters to the drawing, which discloses a preferred form of my present invention, the fixture includes a standard comprising a preferably cast metal or otherwise suitably formed skeleton end-frame 1 having a central upstanding yoke cone-shaped in end elevation and so-called arms extending outwardly from, and on opposite sides of, the base of the yoke, said arms being provided or formed at their respective upper outer corners with preferably integrally formed sleeves 2, 2'. Preferably integrally formed in the apex of the yoke of the end frame 1, is a sleeve or bearing 4, through which is an internally threaded hole 5 for receiving a wing knob set screw or the like 6. The frame 1 is also provided with laterally outwardly facing side surfaces 7, 8, and is further provided along its bottom with machined surfaces 9, 10, carefully milled so as to lie precisely in the same plane, thereby providing an accurate bed surface for the fixture or stand.

Engaged at one respective extremity within the sleeves 2, 2', and secured rigidly therein by means of set screws or the like 11, are longitudinally extending side rods or work positioning means 12, 12', mounted similarly on the opposite extremities of which is a second end-frame 13 in all respects similar to the end-frame 1 and completing the standard of the fixture, the frame 13 having like laterally disposed sleeves 14, 14', and a centrally disposed bearing sleeve 15, and the respective axes of the several sleeves of one end-frame being in alignment with the axes of the like sleeves on the opposite end frames. Accordingly, when the rods 12 are engaged at their respective opposite extremities in the sleeves 2, 14, the end-frames 1, 13, will be rigidly secured together in suitably spaced parallel relation, the correspondingly opposite machine end surfaces thereof lying in a single plane and the axes of the bearing sleeves 4, 15, extending in the same line.

Positioned within the sleeves 4, 15, are arbors or trunnions 16, 17, respectively, the arbors 16, 17, extending axially toward each other and being of a suitable circumferential size to snugly fit the semi-circular aligned surfaces of the end main bearing portions formed in a standard automotive cylinder block, such, for instance, as the block A shown. The axes of the rods 12 are parallel to the axial line of the arbors 16, 17, and are so positioned with respect to such axial line that the usual or normal cylinder head retaining bolts 18 of a particular V-type cylinder block A, for which the fixture or stand is especially designed, may rest thereupon in such manner that the opposite bank of cylinders, as $a$, will be disposed in a truly vertical plane for cylinder boring operation, as is best illustrated by the position of the cylinder block A as indicated in dot-dash lines in Figure 1 and in full lines in Figure 2. It will be apparent that, when the one bank of cylinders $a$ has been completely bored, the cylinder boring tool may be withdrawn from the cylinder block and the cylinder block rotated or oscillated about the arbors 16, 17, through an angle of 90° from the position indicated at B in Figure 2 to the position indicated at B', thus bringing the other bank of cylinders into vertical cylinder boring position.

The present stand or fixture thus enables a V-type automotive cylinder block to be positioned for cylinder boring or other desired operations in a simple, economical manner and to be selectively swung and supported so that both banks of cylinders may be bored without the necessity of relining and resetting.

The present stand or fixture further provides for retentively mounting a V-type automotive cylinder block in such manner that the cylinders may be successively bored in true accurate alignment without laboriously resetting the entire machine and tool assembly for each separate boring operation.

The present stand also provides an inexpensive, economically constructed machine shop fixture suitable for the purposes described, which is of comparatively simple and convenient design and is practically proof against errors arising from multiplied resetting and repositioning of the boring tools, which heretofore, so far as I am aware, have been required in effecting operations of the type mentioned.

The stand is sturdy and durable, easily assembled and likewise as easily knocked down for compact convenient handling or shipment, and is exceedingly efficient in the performance of its intended functions.

It will be understood that changes and modifications in the form, construction, arrangement, and combination of the several parts of the fixture may be made and substituted for those herein shown and described without departing from the nature and principle of my present invention.

Having thus described my invention, what I claim and desire to secure by Letters Patent is,—

1. A stand for supporting an engine block structure and positioning the structure for cylinder boring operations, comprising a pair of supporting frames spaced apart a distance greater than the length of the engine structure, opposed arbors carried by the frames engaging the main bearings of an engine structure therebetween for oscillatory movement, said frames having portions definitely locating the block with respect to the work supporting table of a boring machine, and means on said frames definitely limiting oscillatory movement of the engine structure to dispose the cylinder openings in definitely located relation to the work supporting table.

2. An engine block reboring fixture to support a block in a boring machine comprising a supporting frame structure, opposed spaced arbors on the frame structure engageable in shaft bearings of the engine block and thus supporting said block for oscillatory movement, the frame structure having base rest portions positioning the frame in predetermined relation on the work supporting table of a boring machine, and means on the frame stopping oscillatory movement of the engine block to position the cylinder bores in predetermined axial angular relation with respect to the work supporting table.

3. In an engine cylinder block reboring fixture for use in supporting and positioning upon the work table of a boring machine a cylinder block having extending stud bolts spaced away from the cylinder opening, a frame structure having supporting portions receivable upon the work table, opposed arbors carried by the frame structure spaced above the supporting portions receivable in the main bearings of an engine block for supporting the block for oscillatory movement, and means on the supporting frame engagable with the stud bolts stopping oscillatory movement of the block to position said block with the axes of the cylinder openings in predetermined angular relation to the plane of the work supporting table.

WALTER G. VOLLMER.